US009622048B2

(12) United States Patent
Seo et al.

(10) Patent No.: US 9,622,048 B2
(45) Date of Patent: Apr. 11, 2017

(54) SNS BASED INCIDENT MANAGEMENT

(71) Applicant: KT CORPORATION, Gyeonggi-do (KR)

(72) Inventors: Dong-Seob Seo, Sejong-si (KR); Jung-Guen Kim, Daejeon (KR); Myung-Woo Seo, Daejeon (KR); Young-Chan Jekal, Daejeon (KR)

(73) Assignee: KT CORPORATION, Gyeonggi-do (KR)

( * ) Notice: Subject to any disclaimer, the term of this patent is extended or adjusted under 35 U.S.C. 154(b) by 130 days.

(21) Appl. No.: 14/552,589

(22) Filed: Nov. 25, 2014

(65) Prior Publication Data
US 2015/0145696 A1 May 28, 2015

(30) Foreign Application Priority Data

Nov. 25, 2013 (KR) .................. 10-2013-0143977

(51) Int. Cl.
*G06F 17/00* (2006.01)
*G06N 5/00* (2006.01)
*H04W 4/04* (2009.01)
*H04W 4/14* (2009.01)
*G08G 1/01* (2006.01)

(52) U.S. Cl.
CPC .......... *H04W 4/046* (2013.01); *G08G 1/0116* (2013.01); *G08G 1/0133* (2013.01); *H04W 4/14* (2013.01)

(58) Field of Classification Search
CPC . G08G 1/096766; G08G 1/096; H04W 4/046; H04W 4/14; H04W 4/04; G06Q 50/10; G06Q 50/30

USPC ...................................... 706/45–47; 340/905
See application file for complete search history.

(56) References Cited

U.S. PATENT DOCUMENTS

| 8,121,618 | B2 * | 2/2012 | Rhoads | G01C 21/20 455/456.1 |
| 8,279,786 | B1 * | 10/2012 | Smith | H04W 16/14 370/310 |
| 8,301,765 | B2 * | 10/2012 | Goodman | G06Q 10/06 455/435.1 |
| 9,070,101 | B2 * | 6/2015 | Abhyanker | G01C 1/00 |
| 9,232,040 | B2 * | 1/2016 | Barash | G08B 21/0211 |
| 2012/0123667 | A1 * | 5/2012 | Gueziec | G08G 1/0112 701/119 |

(Continued)

FOREIGN PATENT DOCUMENTS

KR  10-2010-0084911 A  7/2010
KR  10-1186774 B1  9/2012

(Continued)

*Primary Examiner* — Eric M Blount
(74) *Attorney, Agent, or Firm* — IP Legal Services, LLC

(57) ABSTRACT

The disclosure is related to a method of identifying an incident occurring in a service area by a server. The method may include detecting abnormal traffic generation in a service area of the server, collecting text data from at least one of a social network service (SNS) system, access points and base stations associated with a location of the abnormal traffic generation, collecting sensing data from at least one of sensors installed around the location of the abnormal traffic generation, and identifying an incident occurring in the service area based on the collected text data and the collected sensing data.

18 Claims, 4 Drawing Sheets

(56) References Cited

U.S. PATENT DOCUMENTS

| | | |
|---|---|---|
| 2013/0095867 A1 | 4/2013 | Kim et al. |
| 2013/0238544 A1 | 9/2013 | Kunjithapatham et al. |
| 2014/0051379 A1* | 2/2014 | Ganesh ............ H04M 1/72538 |
| | | 455/404.1 |
| 2014/0164505 A1* | 6/2014 | Daly ....................... H04L 67/02 |
| | | 709/204 |
| 2014/0214832 A1* | 7/2014 | Nandakumar ......... G06Q 50/01 |
| | | 707/737 |

FOREIGN PATENT DOCUMENTS

| | | |
|---|---|---|
| KR | 10-2013-0042444 A | 4/2013 |
| KR | 10-2013-0090612 A | 8/2013 |
| KR | 10-2013-0102008 A | 9/2013 |

* cited by examiner

FIG. 4

| Primary keyword (4010) | Secondary keyword (4020) | | | | |
|---|---|---|---|---|---|
| Traffic | Collision | Accident | Traffic jam | Signal Failure | Pedestrian |
| Fire | Flame | Smoke | explosion | Flare | Heat |
| Environmental | Storm | Earthquake | Gas leakage | Tornado | Tsunami |
| Security | Robbery | Burglary | Pickpocket | Fight | Assaulting |

(a)

| Incident (4011) | Incident identification code (4012) | Sub-classifications (4013) | Classification identification code (4014) |
|---|---|---|---|
| Traffic | TRF | Collision | 001 |
|  | TRF | Traffic Jam | 002 |
|  | TRF | Signal failure | 003 |
| Environmental | ENV | Storm | 001 |
|  | ENV | Earthquake | 002 |
|  | ENV | Tsunami | 003 |
| ... | ... | ... | ... |

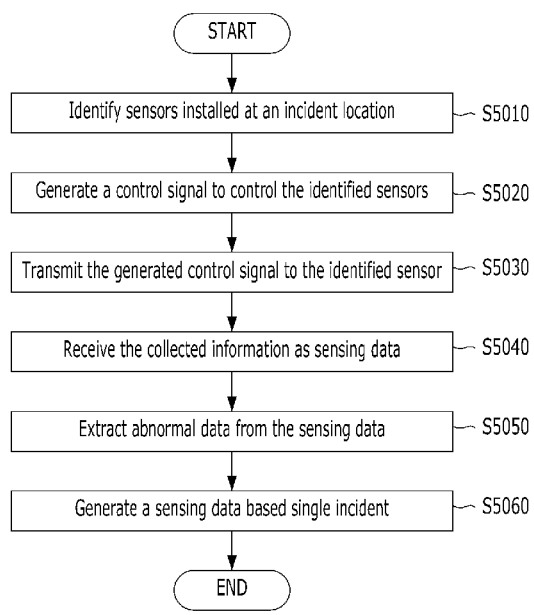

SNS BASED INCIDENT MANAGEMENT

CROSS REFERENCE TO PRIOR APPLICATIONS

The present application claims priority under 35 U.S.C. §119 to Korean Patent Application No. 10-2013-0143977 (filed on Nov. 25, 2013).

BACKGROUND

The present disclosure relates to controlling and managing incidents occurring in a predetermined service area and, more particularly, to accurately identifying incidents based on text data and sensing data.

An urban incident control and management system has been introduced. Such a system may monitor activities in a predetermined service area and detect incidents occurring in the predetermined service area. However, such a typical system uses sensors installed in the predetermined service area to monitor and identify the incidents. Since the sensors provide simple data, such a typical system may not identify an incident accurately.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, an incident occurring at a predetermined service area may be accurately identified based on sensing data collected from sensors and text data collected from a social network service platform.

In accordance with at least one embodiment, a method may be provided for identifying an incident occurring in a service area by a server. The method may include detecting abnormal traffic generation in a service area of the server, collecting text data from at least one of a social network service (SNS) system, access points and base stations associated with a location of the abnormal traffic generation, collecting sensing data from at least one of sensors installed around the location of the abnormal traffic generation, and identifying an incident occurring in the service area based on the collected text data and the collected sensing data.

The text data may include information on contents included in at least one of text messages, short message service (SMS) messages, multimedia message service (MMS) messages, social network service (SNS) messages, and texts, which are exchanged among individuals and posted at a predetermined site through at least one of the access points, the base stations, and the SNS system in or associated with the service area of the server.

The sensing data may include information sensed and collected by the sensors from the location of the abnormal traffic generation.

The detecting abnormal traffic generation may include monitoring data traffic generated at the access points and the base stations in the service area and detecting at least one of the access points and the base stations generating an abnormal traffic amount based on the monitoring result. The detecting at least one of the access points and the base stations may include determining one generating the abnormal traffic amount when a data traffic amount in a predetermined period increases abruptly, when a data traffic amount in a predetermined period decreases abruptly, when a data traffic amount in a predetermined period is greater than a first threshold, or when a data traffic amount in a predetermined period is smaller than a second threshold.

The collecting text data may include obtaining a location of one of an access point and a base station generating an abnormal traffic amount, as the location of the abnormal traffic generation, selecting a SNS system associated with the obtained location, requesting the selected SNS system and the one generating the abnormal traffic amount to provide text data associated with the abnormal traffic generation, and receiving the text data in response to the request.

The collecting text data may include dividing the collected text data into words, extracting primary keywords and secondary keywords from the words of the collected text data, and identifying an incident based on the extracted primary keywords and the extracted secondary keywords. A primary keyword table and an incident information table may be used to extract the primary keywords and the secondary keywords from the words of the collected text data.

The collecting text data may further include obtaining an incident identification code mapped to at least one of the extracted primary keywords using an incident information table, determining at least one sub-classification of the identified incident based on the secondary keywords, obtaining at least one of classification identification codes mapped to the determined sub-classification using the incident information table, and generating a text data based single incident based on the information on the extracted primary keywords, the extracted secondary keywords, the identified incident, the determined incident identification code, and the determined classification identification codes.

The collecting text data may further include obtaining, as a second location, a location of the identified incident based on the words of the collected text data.

The collecting sensing data may include determining a location of an occurring incident based on the collected text data, as a second location, selecting sensors installed at the second location, generating a control signal to request the selected sensors to collect information, and transmitting the generated control signal to the selected sensors through a communication network.

The collecting sensing data may further include receiving, as the sensing data, the collected information from the selected sensors in response to the control signal, extracting abnormal data from the sensing data, and generating a sensing data based single incident based on the extracted abnormal data, the second location, and the received sensing data.

The identifying an incident occurring in the service area may include generating a text data based single incident by analyzing the collected text data, generating a sensing data based single incident by analyzing the collected sensing data, and identifying the incident by analyzing information included in the generated text data based single incident and the generated sensing data based single incident.

The method may further include selecting an action flow matched with the identified incident and performing a set of operations based on the selected action flow. The performing a set of operations may include generating an inform message including information on the identified incident and transmitting the generated inform message to entities associated with the selected action flow through a communication network.

In accordance with another embodiment, a method may be provided for identifying an incident occurring in a service area of a server. The method may include detecting one of access points and base stations, which generates an abnormal traffic amount, selecting a social network service (SNS) system associated with a location of the detected one, requesting the selected SNS system and the one generating the abnormal traffic amount to provide text data associated with the abnormal traffic generation, receiving the text data in response to the request, and identifying an incident based on the received text data.

The identifying an incident may include dividing the received text data into words, extracting primary keywords and secondary keywords from the words of the collected text data, and identifying an incident based on the extracted primary keywords and the extracted secondary keywords.

The identifying an incident may further include obtaining an incident identification code mapped to at least one of the extracted primary keywords using an incident information table, determining at least one sub-classification of the identified incident based on the secondary keywords, obtaining at least one of classification identification codes mapped to the determined sub-classification using the incident information table, and identifying the incident based on the obtained incident identification code and the obtained classification codes.

The method may further include determining a location of an occurring incident based on the received text data, as a second location, selecting sensors installed at the second location, generating a control signal to request the selected sensors to collect information, transmitting the generated control signal to the selected sensors through a communication network, and receiving sensing data from the selected sensors. The incident may be identified based on the received sensing data with the text data.

The method may further include selecting an action flow matched with the identified incident, generating an inform message including information on the identified incident, and transmitting the generated inform message to entities associated with the selected action flow through a communication network.

BRIEF DESCRIPTION OF THE DRAWINGS

The above and/or other aspects of some embodiments of the present invention will become apparent and more readily appreciated from the following description of embodiments, taken in conjunction with the accompanying drawings, of which:

FIG. 4 illustrates a primary keyword table and an incident information table in accordance with at least one embodiment;

FIG. 5 illustrates collecting and processing sensing data to further accurately identify an incident occurring in a predetermined service area in accordance with at least one embodiment.

DETAILED DESCRIPTION OF EMBODIMENTS

Figure 1:
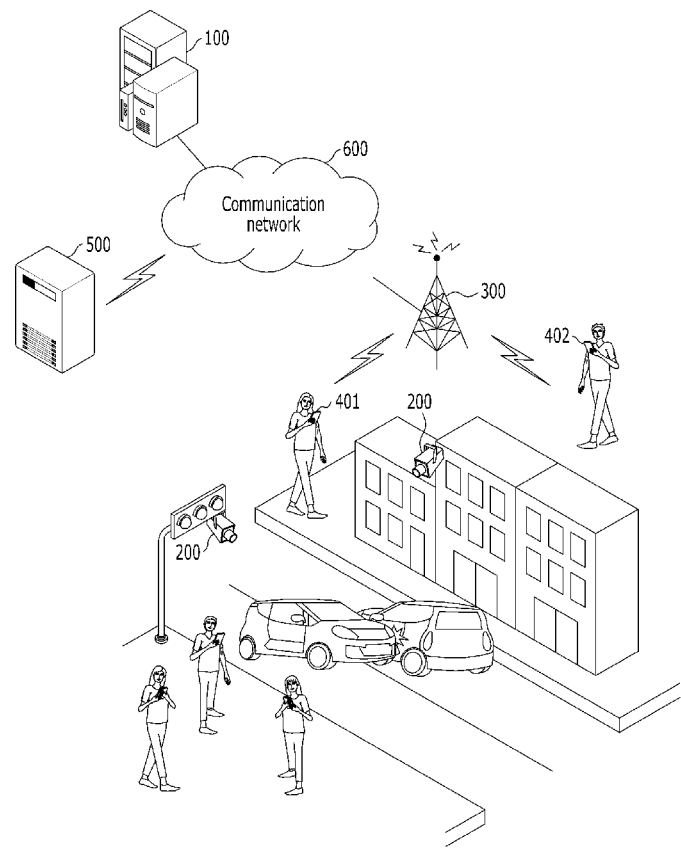
FIG. 1 illustrates an overall view for identifying and managing disasters based on text data and sensing data in accordance with at least one embodiment.

Reference will now be made in detail to exemplary embodiments of the present invention, examples of which are illustrated in the accompanying drawings, wherein like reference numerals refer to like elements throughout. The embodiments are described below, in order to explain embodiments of the present invention by referring to the figures.

In accordance with at least one embodiment, an incident may be accurately identified based on text data collected from a communication network including a social network service platform and sensing data collected from associated sensors in a predetermined service area and a set of predetermined actions may be performed to cope with the identified incident. Hereinafter, such an operation of identifying and managing an incident based on text data and sensing data will be described with reference to FIG. 1.

FIG. 1 illustrates an overall view for identifying and managing incidents based on text data and sensing data in accordance with at least one embodiment.

Referring to FIG. 1, in order to identify and manage incidents in a predetermined service area, server 100 may be coupled to communication network 600 and collect various types of information from associated entities coupled to communication network 600 in accordance with at least one embodiment. In particular, server 100 may monitor a predetermined service area and identify incidents occurring in the predetermined service area based on the monitoring result, and control and/or manage related parties or organizations to take action against the incident. Server 100 may communicate with base station 300, social network service (SNS) system 500, and various types of sensors (e.g., 200) installed at the predetermined service area through communication network 600.

In order to accurately identify, server 100 may collect text data from messages exchanged among individuals and posted by individuals on a social network service (SNS) and/or collect sensing data from various types of sensors installed at a predetermined service area. For example, server 100 may detect occurrence of an incident based on text data and then control sensors installed at an associated area to collect more detailed information about the incident.

Such server 100 may be a computing system coupled to communication network 600. For example, server 100 may have capabilities of processing certain operations and communicating with other entities coupled to communication network 600. Communication network 600 may include a mobile communication network and a data communication network.

Server 100 may communicate with a plurality of base stations and access points in a predetermined service area through communication network 600. For example, server 100 may constantly monitor traffic generated at base stations and access points (e.g., base station 300). In particular, server 100 may request such base stations and access points to provide information on a traffic amount at a predetermined interval or upon generation of a predetermined event.

In response to such a request, server 100 may be provided with such information from base stations and/or access points (e.g., base station 300) in the predetermined service area. Based on such information, server 100 may determine whether a traffic amount at a certain location increases abruptly, but the present invention is not limited thereto. For example, server 100 may request base station 300 to monitor a traffic amount and to determine abrupt increment in the traffic amount.

In addition, server 100 may request base station 300 to provide a text message, a short message service (SMS) message, and a multimedia message service (MMS) text message, which are exchanged among individuals (e.g., between user equipment 401 and 402) through base station 300. In response to the request, base station 300 may provide the information on the text message, the SMS message, and the MMS message to server 100.

Base station 300 may be a station providing a communication service to user equipment. That is, base station 300 may connect user equipment to communication network 600 and enable the user equipment to communicate with other entities through communication network 600. Base station 300 may be exemplary illustrated in FIG. 1 as a representative entity that provides such a communication service to user equipment. Accordingly, base station 300 may be referred to as an access point.

In accordance with at least one embodiment, base station 300 may monitor a traffic amount in association with user equipment (e.g., user equipment 401 and 402) and determine whether the traffic amount increases abruptly or is higher than a predetermined traffic level. Upon the detection of the abrupt increments in the traffic amount, base station 300 may transmit a message to server 100 to inform of the abnormal traffic amount. Such a message may include information on a location of base station 300, a time of generating the abnormal traffic amount, and information on associated data traffic.

The present invention, however, is not limited thereto. For example, base station 300 may transmit information on a traffic amount of data traffic generated at base station 300 in association with user equipment 401 and 402 in response to a request from server 300 or at a regular interval. In this case, server 100 may monitor a traffic amount of data traffic generated at base station 300 based on the received information and determine whether a traffic amount increases abruptly at base station 300. Upon the detection of the abrupt increment, server 100 may collect text data associated with user equipment 401 and 402 coupled to base station 300 in accordance with at least one embodiment.

As described, server 100 may be coupled to various types of sensors 200 installed at a predetermined service area. Sensors 200 may be a device detecting events, incidents, or changes in quantities, in a predetermined service area. That is, sensors 200 may collect predetermined types of information on changes, incidents, and events occurring in the predetermined service area. For example, sensors 200 may include a monition sensor, a temperature sensor, a closed circuit TV (CCTV), a surveillance camera, a pressure sensor, and so forth. In accordance with at least one embodiment, such sensor 200 may collect information on changes or incidents occurring in a predetermined service area and provide the collected information as sensing data to server 100 in response to a request from server 100 or upon a predetermined interval. Server 100 may receive such collected information as sensing data from sensor 200 and identify an incident based on the sensing data.

As described, server 100 may be coupled to SNS system 500 through communication network 600. SNS system 500 may be a group of computing servers for providing a social network service to individuals through user equipment 401 and 402. For example, SNS system 500 may be a server of a SNS service provider. That is, individuals may be registered at SNS system 500. Such registered individuals may be enabled to post images and messages on a web-site provided by SNS system 500 or to exchange messages through SNS system 500.

In accordance with at least one embodiment SNS system 500 may receive a request message from server 100 to provide text data associated with a predetermined location. Such a request message may include information on a target location to collect text data generated at the target location. In response to the request message, SNS system 500 may collect text data generated at the target location and provide the collected text data to server 100. Server 100 may receive the collected text data and identify an incident based on the text data from SNS system 500.

As described, server 100 identifies an incident based on text data from SNS system 500 and sensing data from sensors 200 in accordance with at least one embodiment. Hereinafter, such server 100 will be described in detail with reference to FIG. 2.

Figure 2:
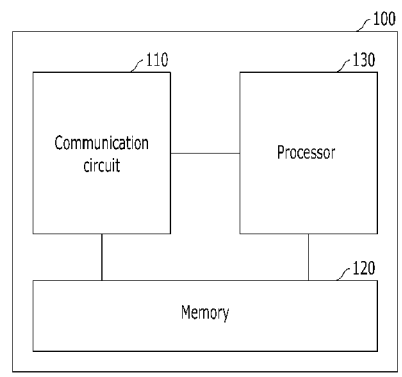
FIG. 2 illustrates a server of monitoring a predetermined service area based on text data and sensing data and identifying an incident based on the monitoring result in accordance with at least one embodiment.

FIG. 2 illustrates a server of monitoring a predetermined service area based on text data and sensing data and identifying an incident based on the monitoring result in accordance with at least one embodiment.

Referring to FIG. 2, server 100 may include communication circuit 110, memory 120, and processor 130 in accordance with at least one embodiment. Communication circuit 110 may receive information, data, and/or signals from and transmit information, data, and/or signal to other entities including SNS system 500, base station 300, and user equipment 401 and 402. Communication circuit 110 may include at least one module for communicating with other entities coupled to communication network 600. For example, communication circuit 110 may include any or all of a broadcasting signal receiving module, a mobile communication module, a wireless internet module, a short-distance communication module, and a location information module (e.g., GPS receiving module). The short-distance communication module may include a Bluetooth circuit, a radio frequency identification (RFID) circuit, an infrared data association (IrDA) circuit, an ultra-wideband (UWB) circuit, a Zigbee circuit, and a near field communication (NFC) module circuit. In particular, communication circuit 110 may include a transmitter and a receiver.

In accordance with at least one embodiment, communication circuit 110 may transmit a request message to at least one of SNS system 500 and base station to request text data generated at a predetermined area. In addition, communication circuit 110 may transmit a control signal to sensors 200 to collect information on an incident occurring in a predetermined service area.

Communication circuit 110 may receive text data from SNS system 500 and/or base station through communication network 600. Also, communication circuit 110 may receive sensing data from sensors 200 through communication network 600.

Memory 120 may be data storage storing information necessary for driving server 100 and performing certain operation upon generation of a predetermined event. Such information may include any software programs and related data. Memory 120 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto.

In particular, memory 120 may store sensor data collected from sensors 200 and text data received from SNS system 500 or base station 300. Memory 120 may store an incident information table and a primary keyword table. Furthermore, memory 120 may store keywords extracted from the text data. That is, memory 120 may store various types of information collected and obtained from other entities to identify an incident occurring in a predetermined service area.

Processor 130 may perform operations for controlling associated constituent elements and other entities (e.g., sensors 200) coupled through communication network 600. For example, processor 130 may be a central control unit (CPU) of server 100. Processor 130 may control constituent elements of server 100 for performing operations for identifying an incident occurring in a predetermined service area in accordance with at least one embodiment.

For example, processor 130 may perform operations for monitoring a traffic amount of data traffic generated at base station 300 by analyzing the information received from base station 300 and detect abnormal change in the traffic amount based on the monitored traffic amount (e.g., abrupt increment or abrupt decrement of the traffic amount). Upon the detection of the abnormal change, processor 130 may perform operation for i) determining a SNS system associated with data traffic generated at base station 300, ii) generating a request message to request text data associated with base station 300, and iii) transmitting the generated request message to SNS system 500 to request providing text data. In addition, processor 130 may perform operations for collecting text message, SMS messages, and MMS messages exchanged through base station 300 among individuals (e.g., user equipment 401 and 402).

In response to the request message, the text data may be received through communication circuit 110 from SNS system 500. Processor 130 may process the received text data and generate a text data based single event based on the processed text data.

In addition to the text data, processor 130 may also process sensing data and generate a sensing data based single event based on the processed sensing data. For example, processor 130 may i) determine a target area to collect sensing data based on the location where the abnormal change in traffic amount is detected, ii) select sensors 200 installed at the target area, iii) generate control signals to control the selected sensors 200, and iv) control communication circuit 110 to transmit the generated control signal to the selected sensors 200 in response to a request signal to collect the sensing data, upon generation of a predetermined event, or at a predetermined interval. The sensing data based single event may denote an incident identified as occurring at a predetermined service area based on the sensing data. The sensing data based single event may include information on an incident, an incident identification code, a corresponding service theme, and so forth.

Processor 130 may accurately identify an actual incident occurring at the predetermined service area based on the sensing data based single event and the text data based single event in accordance with at least one embodiment. Processor 130 may select an action flow matched with the identified incident and perform at last one of operations based on the selected action flow. The action flow may be previously defined for each incident by at least one of a system designer, an operator, an associated organization, and so forth.

Processor 130 may determine whether it is possible to cause another supplementary incident by the identified single incident. When it is possible, processor 130 may select an action flow matched with the supplementary incidents and perform operations based on the selected action flow.

Processor 130 may generate signals and messages to cope with the identified incident and secondary incidents based on the selected action flows in accordance with at least one embodiment. The signals and messages may include information on an identified incident, secondary incidents, a location of the identified incident, organizations, devices, and entities associated with the identified incident and the secondary incidents based on the selected action flows. Processor 130 may transmit the generated signal and message to the associated organizations, entities, and devices through communication circuit 110.

Processor 130 may continuously monitor the identified incident through continuously collecting text data and sensing data and determine whether the identified incident is controlled and managed. When the identified incident is managed, processor 130 may generate a termination event.

As described, server 100 identifies an incident occurring at a predetermined service area based on text data (e.g., text messages, social network service (SNS) messages, SMS messages, MMS message, and so forth) exchanged among individuals. Hereinafter, such a method of collecting and processing text data in accordance with a t least one embodiment will be described with reference to FIG. 3 and FIG. 4.

Figure 3:
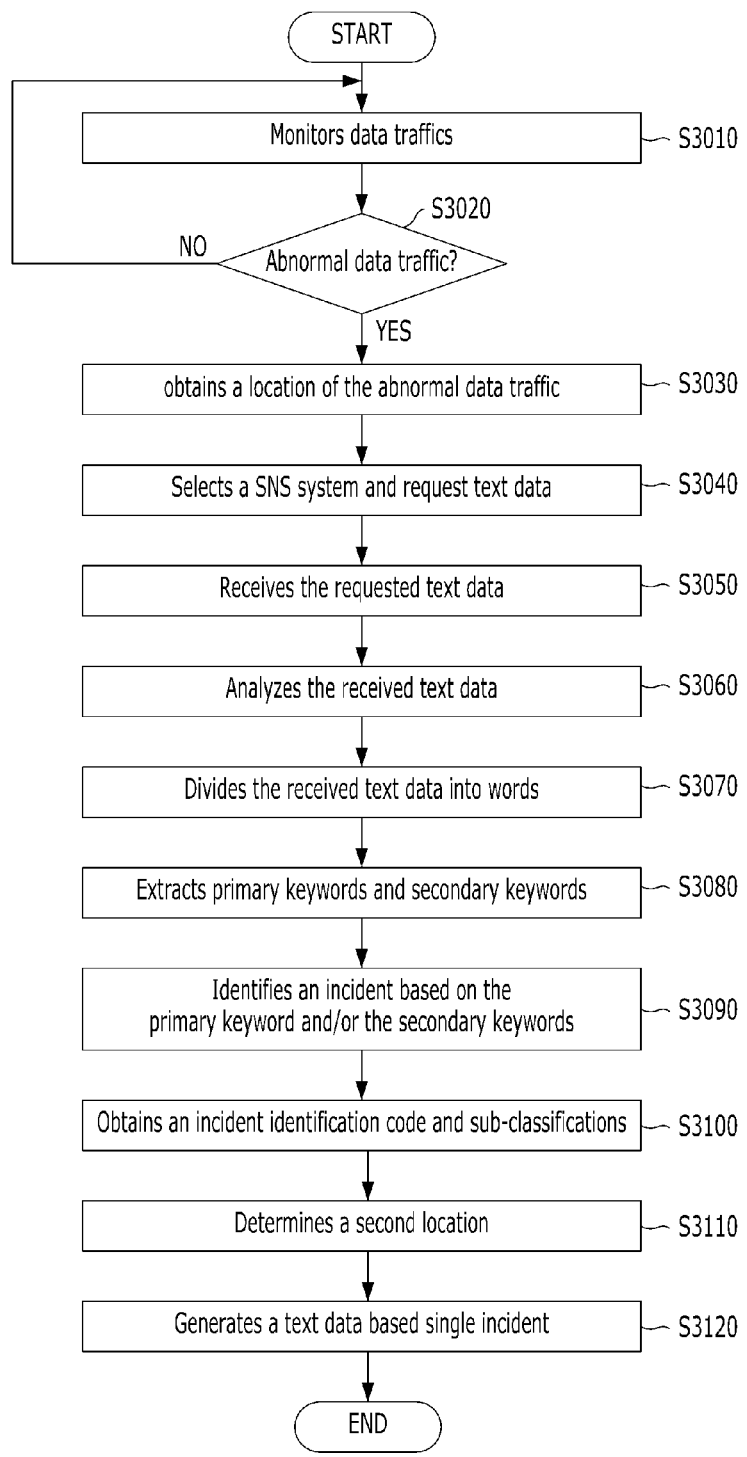
FIG. 3 illustrates collecting and processing text data in accordance with at least one embodiment.

FIG. 3 illustrates collecting and processing text data in accordance with at least one embodiment.

Referring to FIG. 3, server 100 monitors data traffics generated at a predetermined service area at step S3010. For example, server 100 may transmit a request message to base stations and access points (e.g., base station 300) located in the predetermined service area to provide information on generated data traffic and a traffic amount thereof at a regular interval or upon generation of a predetermined event. In response to the request, each one of the base stations and the access points obtains and transmits the requested information on the generated data traffic and the traffic amount thereof to server 100 through communication network 600.

At step S3020, server 100 determines whether abnormal data traffic is generated at the predetermined service area based on the monitoring result. For example, server 100 may receive the request information on the generated data traffic and the traffic amount thereof from the base stations and the access points in the predetermined service area and analyze the received information. Based on the analysis result, server 100 may determine whether a traffic amount of the predetermined service area increases abruptly, whether a traffic amount of the predetermined service area decreases abruptly, determine whether a traffic amount of a certain base station or access point is higher than a predetermined threshold, or determine whether a traffic amount of a certain base station is lower than a predetermined threshold. Such received information on the data traffic and the traffic amount thereof may be stored in memory 120. For example, the information may include an average traffic amount, a maximum traffic amount, a minimum traffic amount, contents in the data traffics, and so forth.

When the abnormal data traffic is not detected (No—S3020), server 100 may continuously monitor the data traffic in the predetermined service area at step S3010.

Upon detection of an abnormal traffic amount (Yes—S3020), server 100 obtains, as target location information, information on a location of an access point or a base station that generates the abnormal data traffic at step S3030. Such location may be referred to as a first location and corresponding location information may be referred to as first location information. Such first location information may include information on a first location which is comparatively wider than an actual location of an occurring incident. That is, the first location is wider that a second location obtained based on sending data.

At step S3040, server 100 selects a SNS system based on the obtained location information and transmits a request message to the selected SNS system (e.g., SNS system 500) to provide contents of data traffics generated at the target location. For example, the data traffics may include a text message, a SNS text, a SNS message, and data contents, which are exchanged among individuals, transmitted to or received from in order to post texts, messages, and images on a predetermined SNS site through SNS system 500.

At step S3050, server 100 receives the requested contents from SNS system 500, as text data. The requested contents include information on text messages, multimedia messages, and short messages, exchanged among individuals, and texts and images transmitted to a SNS system to post the messages and images on a predetermined SNS web-site, data transmitted from or received at the predetermined access point or base station 300, but the present invention is not limited thereto. Such target text data may include SNS message, a short message service (SMS) message, a multimedia message service (MMS) message.

In addition, server 100 may request base station 300 to provide information on text messages, SMS messages, and MMS messages exchanged among individuals (e.g., user equipment 401 and 402). In response to such a request, server 100 may receive the requested information on the text message, the SMS messages, and the MMS messages from base station 300. For convenience and ease of understanding, base station 300 was described as providing the information on the text message, the SMS messages, and the MMS messages, but the present invention is not limited thereto. For example, access points and base stations included in the predetermined service area may provide such information to server 100 at a regular interval or upon generation of a predetermined event.

At step S3060, server 100 analyzes the received text data using a primary keyword table and an incident information table. For example, server 100 may store a primary keyword table and an incident information table in memory 120. The primary keywords and the secondary keywords may be previously defined by at least one of a system designer, an operator, a service provider, an associated organization, a government, and so forth. Based on the primary keywords and the secondary keywords, server 100 identifies an incident occurring at a predetermined service area by detecting predetermined keywords in the text data. A method of extracting keywords from the text data and a method of analyzing the received text data are not limited to one particular method in accordance with at least one embodiment. Hereinafter, such a primary keyword table and the incident information table will be described with reference to FIG. 4.

FIG. 4 illustrates a primary keyword table and an incident information table in accordance with at least one embodiment.

Referring to FIG. 4, a diagram a) illustrates a primary keyword table and a diagram b) illustrates an incident information table. As shown in the diagram a), the primary keyword table may include information on primary keywords 4010 and secondary keywords 4020 related to each primary keyword. For example, a primary keyword "Traffic" is mapped to secondary keywords "collision", "accident", "traffic jam", "signal failure", "pedestrian", and so forth. That is, the primary keyword is a name of an incident and the secondary keywords are words related to a corresponding incident. For another example, a primary key "environmental" is mapped to secondary keywords "storm", "Earthquake", "Gas leakage", "tornado", and "tsunami."

Referring back to FIG. 3, at step S3070, server 100 divides the received contents into words and extracts keywords from the received contents based on the analysis result. For example, server 100 detects keywords to identify an incident in the received contents by comparing words in the received contents with primary keywords and/or secondary keywords in the primary keyword table. Server 100 extracts the detected keywords from the collected text data from SNS system 500 based on comparison result.

At step S3080, server 100 extracts primary keywords and secondary keywords from the extracted keywords. For example, when traffic, collision, fire, accident, signal failure, pedestrian, flame, smoke, and heat are extracted from the text data, server 100 extracts "traffic" and "fire" as the primary keywords. Furthermore, server 100 extracts collision, accident, signal failure, pedestrian, flame, smoke, and heat as secondary keywords.

When there is not primary keywords in the extracted keywords, server 100 may find a primary keyword based on the extracted secondary keywords. For example, when collision, accident, signal failure, pedestrian, flame, smoke, and heat are extracted from the text data, server 100 may find traffic and fire as primary keywords related to the secondary keywords extracted from the text data.

At step S3090, server 100 identifies an incident based on the primary keyword and/or the secondary keywords. For example, when one primary keyword is detected, server 100 determines an incident related to the detected primary keyword is occurring at the predetermined service area. That is, when a primary keyword "Traffic" is detected, server 100 determines a traffic incident occurring at the predetermined service area. When two primary keywords are detected, server 100 may select one of the two detected primary keywords based on the number of related second keywords in the text data or the number of each primary keyword included in the text data.

At step S3100, server 100 obtains an incident identification code associated with the identified incident and sub-classifications of the identified incident based on an incident information table. For example, as shown in FIG. 4, the incident information table may include information on incidents (e.g., primary keyword), related incident identification codes, associated sub-classifications, and classification identification codes.

For example, when an identified incident is a traffic incident, server 100 may obtain TRF as the incident identification code for the identified incident. In addition, server 100 may further classify the traffic incident to sub-classifications, such as collision, traffic jam, signal failure, and so forth. Such classification may be performed based on secondary keywords detected in the received text data. That is, server 100 may consider the number of each secondary keyword appearing in the received text data to classify the identified incident to the sub-classification. With the sub-classifications related to the primary keyword, server 100 may identify an incident more accurately. That is, when the second keyword "collision" is appeared in the text data 12 times, server 100 may classify the traffic incident into the sub-classification "collision". Based on such classification, server 100 may determine that the predetermined service area has a traffic incident caused by the collision.

After classification, server 100 obtains a classification identification code associated with the sub-classification of the identification incident. For example, since the collision is the sub-classification of the traffic incident, server 100 obtains the classification identification code of "001" as the classification identification code. The obtained incident identification code and the classification identification code may be used to select an action flow matched with the identified incident in accordance with at least one embodiment.

At step S3110, server 100 determines a location of the identified incident based on words in the text data, as a second location (e.g., second location information). Server 100 may analyze words of the received text data and find words related to a location of the identified incident. For example, such words may be a name of a building, a street, and a landmark, a name of interaction, an address, and so forth. Based on the obtained location information, server 100 may detect a location of the identified incident more accurately. That is, the second location information is narrower than the first location information. Furthermore, since there is no word related to a location, sever 100 may not detect such second location information from the words in the received text data.

At step S3120, server 100 generates a text data based single incident based on the incident identification code, the sub-classification identification code, and the second location information. Such a generated text data based single incident may include information on the extracted primary keywords and the secondary keywords, information on an identified incident, the incident identification code, the sub-classification identification code, and the second location information.

Based on such a text data based single incident, server 100 may collect sensing data from related sensors 200 to further accurately identify the incident occurring in the predetermined service area in accordance with at least one embodiment. Hereinafter, such a method of processing sensing data to identify an incident occurring in a predetermined service area in accordance with at least one embodiment will be described with reference to FIG. 5.

FIG. 5 illustrates collecting and processing sensing data to further accurately identify an incident occurring in a predetermined service area in accordance with at least one embodiment.

Referring to FIG. 5, after generating the text data based single incident, server 100 may collect sensing data from sensors in a predetermined area. For example, at step S5010, server 100 may identify sensors installed at an incident location based on the second location information. The sensors may be any device for collecting information on activities in a predetermined service area. For example, the sensor may include a surveillance camera, a thermometer, a pressure sensor, a microphone, a motion sensor, and so forth.

At step S5020, server 100 may generate a control signal to control the identified sensors. Such a control signal may include information on a time period of sensing information, a type of information to be collected, a direction to turn a corresponding sensor to collect information, and so forth. At step S5030, server 100 may transmit the generated control signal to the identified sensors in the incident location. For example, sensors (e.g., sensor 200) in the incident location receive the control signal, collect information on activities in the incident location, and transmit the collected information to server 100. At step S5040, server 100 may receive the collected information as sensing data from the sensors in response to the control signal. As described, the sensors were described as providing the sensing data in response to the control signal, but the present invention is not limited thereto. For example, the sensors may regularly collect a predetermined type of information amount a predetermined area and provide the collected information to server 100. In this case, server 100 may use sensing data stored in memory 120. Furthermore, the sensing data may include measurement of a predetermined type of information, images, sound, motion, and so forth.

At step S5050, server 100 may extract abnormal data from the sensing data. For example, server 100 may analyze the sensing data and determine whether the sensing data has an abnormal data based on the analysis result. For example, when a sensor is a thermometer, server 100 may determine whether a temperature measured by the thermometer is too high or too low based on an average temperature in the incident location. When a sensor is a surveillance camera, server 100 may determine whether an image captured by the surveillance camera includes an image of abnormal images such as a robbery, a car accident, fire, or explosion. Such an abnormal data may be previously defined by at least one of a system designer, an operator, a service provider, associated organizations, and government according to a type of a sensor. The defined abnormal data may be stored as abnormal data keywords in memory 120 with the primary keyword table and the incident information table. In order to detect the abnormal data, the primary keyword table and the incident information table may be used as well. That is, the present invention is not limited to one particular method for analyzing and determining an abnormal data in the sensing data.

At step S5060, server 100 may generate a sensing data based single incident based on the sensing data and the extracted abnormal data. The generated sensing data based single incident may include information on the sensing data, the second location information, the extracted abnormal data, and so forth.

As described, server 100 may generate the text data based single incident and the sensing data based single incident and accurately identify an incident occurring at the predetermined service area based on the generated text data based single incident and the sensing data based single incident in accordance with at least one embodiment. Hereinafter, such an operation of accurately identifying an incident based on the text data and the sensing data will be described with reference to FIG. 6.

Figure 6:
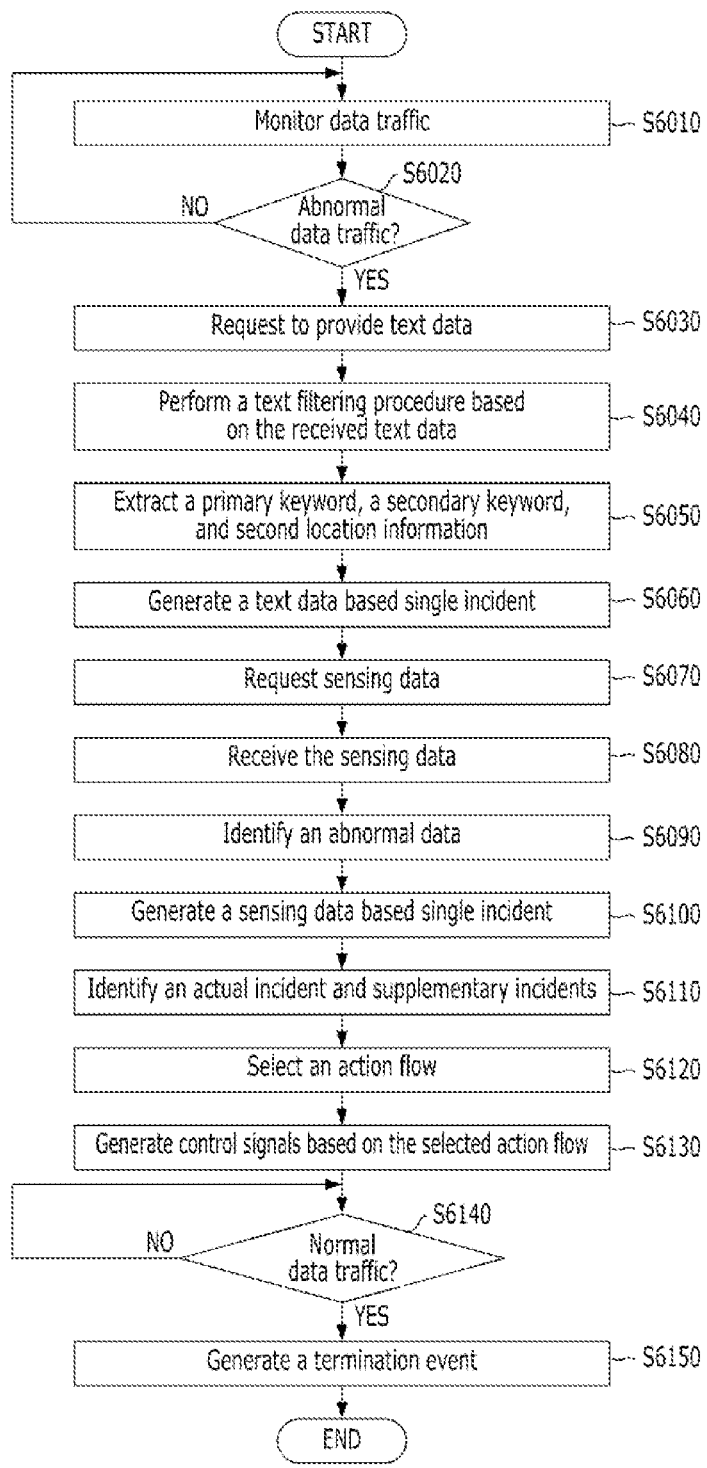
FIG. 6 illustrates a method of identifying an incident occurring in a predetermined service area based on text data and sensing data in accordance with at least one embodiment.

FIG. 6 illustrates a method of identifying an incident occurring in a predetermined service area based on text data and sensing data in accordance with at least one embodiment.

Referring to FIG. 6, at step S6010, server 100 monitors traffic generated from an access point or a base station in a predetermined service area. At step S6020, server 100 may determine whether abnormal data traffic is generated at a certain service area. That is, server 100 may determine whether a data traffic amount increases or decreases abruptly at a certain service area.

When the abnormal data traffic is not generated (No-S6020), server 100 may continuously monitor the access point or the base station at step S6010. When the abnormal data traffic is generated (Yes-S6020), server 100 may obtain, as a first location, information on a location where the abnormal data traffic is generated, request SNS system 500 associated with the first location to provide text data associated with the first location, and receive the text data from the SNS system 500 at step S6030.

At step S6040, server 100 may perform a text filtering procedure based on the received text data (e.g., target text). At step S6050, server 100 may extract primary keywords, secondary keywords, and second location information from the text data based on the primary keyword table and the incident information table stored in memory 120, as a result of the text filtering procedure. At step S6060, server 100 may generate a text data based single incident based on the extracted event keyword. Such operation for generating the text data based single incident was described in detail with reference to FIG. 3.

At step S6070, server 100 may select sensors in the first location and/or the second location and transmit a control signal to the selected sensors to collect and provide sensing data. At step S6080, in response to the control signal, server 100 may receive the sensing data from the selected sensors. At step S6090, server 100 may identify abnormal data in the received sensing data and obtain information on locations of sensors associated with the identified abnormal data. At step S6100, server 100 may generate a sensing data based single incident based on the sensing data, the identified abnormal data, and the location of sensors. Such operation of generating the sensing data based single incident was described in detail with reference to FIG. 5.

At step S6110, server 100 may accurately identify an actual incident occurring in a predetermined area and determines whether any supplementary incidents occur based on the text data based single incident and the sensing data based single incident. For example, server 100 identifies the actual incident based on all information included in the text data based single incident and the sensing data based single incident and identifies supplementary incidents caused by the integrated incident For example, when a car collides with a water tank in a very cold weather, such a traffic incident may cause an icy road. In this case, the car collision may be the actual incident, and the icy road may be the supplementary incident.

At step S6120, server 100 may select an action flow associated with the identified actual incident and the supplementary incidents. Such an action flow may be previously defined according to each incident by at least one of a system designer, an operator, a service provider, associated organizations, and government. The action flow may include information on a set of operations to be performed upon the detection of a corresponding incident occurring in a predetermined service area. For example, the set of operations may include an operation for transmitting an informing message of the incident to a predetermined organization such as a police station and a fire department through a communication network, an operation for controlling a predetermined device installed at the location of the incident to perform a predetermined operation (e.g., turning on a spring cooler or controlling a predetermined surveillance camera to zoom in and to follow a certain person), an operation for displaying an informing message on an outdoor advertisement screen, and so forth. At step S6130, server 100 may generate control signals based on the selected action flow to inform the identified actual incident and the supplementary incidents to associated organizations and to control associated devices to cope with the incident.

At step S6140, server 100 may continually monitor the predetermined service area and determine whether the traffic amount is changed to a normal level at a predetermined interval. When the traffic amount is changed to a normal level (Yes—S6140), server 100 may generate a termination event to terminate the processes for managing the actual incident at step S6150. When the traffic amount is not changed to the normal level (No—S6140), server 100 may continuously monitor the data traffic generated at the predetermined service area at step S6150.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of identifying an incident occurring in a service area by a server, the method comprising:
    detecting abnormal traffic generation in a service area of the server;
    collecting text data from at least one of a social network service (SNS) system, access points and base stations associated with a location of the abnormal traffic generation;
    collecting sensing data from at least one of sensors installed around the location of the abnormal traffic generation; and
    identifying an incident occurring in the service area based on the collected text data and the collected sensing data, wherein the collecting sensing data comprises:
    determining a location of an occurring incident based on the collected text data, as a second location;
    selecting sensors installed at the second location;
    generating a control signal to request the selected sensors to collect information; and
    transmitting the generated control signal to the selected sensors through a communication network.

2. The method of claim 1, wherein the text data includes information on contents included in at least one of text messages, short message service (SMS) messages, multimedia message service (MMS) messages, social network service (SNS) messages, and texts, which are exchanged among individuals and posted at a predetermined site through at least one of the access points, the base stations, and the SNS system in or associated with the service area of the server.

3. The method of claim 1, wherein the sensing data includes information sensed and collected by the sensors from the location of the abnormal traffic generation.

4. The method of claim 1, wherein the detecting abnormal traffic generation comprises:
    monitoring data traffic generated at the access points and the base stations in the service area; and
    detecting at least one of the access points and the base stations generating an abnormal traffic amount based on the monitoring result.

5. The method of claim 4, wherein the detecting at least one of the access points and the base stations comprises:
    determining one generating the abnormal traffic amount when a data traffic amount in a predetermined period increases abruptly, when a data traffic amount in a predetermined period decreases abruptly, when a data traffic amount in a predetermined period is greater than a first threshold, or when a data traffic amount in a predetermined period is smaller than a second threshold.

6. The method of claim 1, wherein the collecting text data comprises:
    obtaining a location of one of an access point and a base station generating an abnormal traffic amount, as the location of the abnormal traffic generation;
    selecting a SNS system associated with the obtained location;
    requesting the selected SNS system and the one generating the abnormal traffic amount to provide text data associated with the abnormal traffic generation; and
    receiving the text data in response to the request.

7. The method of claim 1, wherein the collecting text data comprises:
    dividing the collected text data into words;
    extracting primary keywords and secondary keywords from the words of the collected text data; and
    identifying an incident based on the extracted primary keywords and the extracted secondary keywords.

8. The method of claim 7, wherein a primary keyword table and an incident information table are used to extract the primary keywords and the secondary keywords from the words of the collected text data.

9. The method of claim 7, wherein the collected text data further comprises:
    obtaining an incident identification code mapped to at least one of the extracted primary keywords using an incident information table;
    determining at least one sub-classification of the identified incident based on the secondary keywords;
    obtaining at least one of classification identification codes mapped to the determined sub-classification using the incident information table; and
    generating a text data based single incident based on the information on the extracted primary keywords, the extracted secondary keywords, the identified incident, the determined incident identification code, and the determined classification identification codes.

10. The method of claim 7, wherein the collecting text data further comprises:
obtaining, as a second location, a location of the identified incident based on the words of the collected text data.

11. The method of claim 1, wherein the collecting sensing data further comprises:
receiving, as the sensing data, the collected information from the selected sensors in response to the control signal;
extracting abnormal data from the sensing data; and
generating a sensing data based single incident based on the extracted abnormal data, the second location, and the received sensing data.

12. The method of claim 1, wherein the identifying an incident occurring in the service area comprises:
generating a text data based single incident by analyzing the collected text data;
generating a sensing data based single incident by analyzing the collected sensing data; and
identifying the incident by analyzing information included in the generated text data based single incident and the generated sensing data based single incident.

13. The method of claim 1, comprising:
selecting an action flow matched with the identified incident; and
performing a set of operations based on the selected action flow.

14. The method of claim 13, wherein the performing a set of operations comprises:
generating an inform message including information on the identified incident; and
transmitting the generated inform message to entities associated with the selected action flow through a communication network.

15. A method of identifying an incident occurring in a service area of a server, the method comprising:
detecting one of access points and base stations, which generates an abnormal traffic amount;
selecting a social network service (SNS) system associated with a location of the detected one;
requesting the selected SNS system and the one generating the abnormal traffic amount to provide text data associated with the abnormal traffic generation;
receiving the text data in response to the request; and
identifying an incident based on the received text data, wherein the method further comprises:
determining a location of an occurring incident based on the received text data, as a second location;
selecting sensors installed at the second location;
generating a control signal to request the selected sensors to collect information;
transmitting the generated control signal to the selected sensors through a communication network; and
receiving sensing data from the selected sensors,
wherein the incident is identified based on the received sensing data with the text data.

16. The method of claim 15, wherein the identifying an incident comprises:
dividing the received text data into words;
extracting primary keywords and secondary keywords from the words of the collected text data; and
identifying an incident based on the extracted primary keywords and the extracted secondary keywords.

17. The method of claim 15, wherein the identifying an incident further comprises:
obtaining an incident identification code mapped to at least one of the extracted primary keywords using an incident information table;
determining at least one sub-classification of the identified incident based on the secondary keywords;
obtaining at least one of classification identification codes mapped to the determined sub-classification using the incident information table; and
identifying the incident based on the obtained incident identification code and the obtained classification codes.

18. The method of claim 15, comprising:
selecting an action flow matched with the identified incident;
generating an inform message including information on the identified incident; and
transmitting the generated inform message to entities associated with the selected action flow through a communication network.

* * * * *